(12) United States Patent
Kuwabara et al.

(10) Patent No.: US 8,558,491 B2
(45) Date of Patent: Oct. 15, 2013

(54) INVERTER CONTROLLER AND REFRIGERATING AND AIR-CONDITIONING UNIT

(75) Inventors: Yasushi Kuwabara, Chiyoda-ku (JP);
Shinya Matsushita, Chiyoda-ku (JP);
Katsuhiko Saito, Chiyoda-ku (JP);
Masahiro Fukuda, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 84 days.

(21) Appl. No.: 13/419,648

(22) Filed: Mar. 14, 2012

(65) Prior Publication Data

US 2012/0235611 A1  Sep. 20, 2012

(30) Foreign Application Priority Data

Mar. 18, 2011  (JP) ................................. 2011-060752

(51) Int. Cl.
*H02P 1/04* (2006.01)

(52) U.S. Cl.
USPC ................................................... 318/400.17

(58) Field of Classification Search
None
See application file for complete search history.

(56) References Cited

U.S. PATENT DOCUMENTS

2007/0175429 A1* 8/2007 Yanagida et al. ......... 123/179.14
2011/0007536 A1* 1/2011 Takamatsu et al. ........... 363/131

FOREIGN PATENT DOCUMENTS

| JP | 9-23664 A | 1/1997 |
| JP | 2002-199700 A | 7/2002 |
| JP | 2008-278584 A | 11/2008 |

* cited by examiner

*Primary Examiner* — Lincoln Donovan
*Assistant Examiner* — Zoheb Imtiaz
(74) *Attorney, Agent, or Firm* — Buchanan Ingersoll & Rooney PC

(57) ABSTRACT

An inverter controller controlling an inverter main circuit, the inverter controller including: a PWM signal generating part which generates a PWM signal to control on-off of a plurality of switching elements configuring the inverter main circuit; an operating state detecting part which detects an operating state of a load based on a direct current bus voltage of the inverter main circuit, a motor current which flows between the inverter main circuit and the load and an operation instruction to the load; a gate resistance selecting signal generating part which generates a gate resistance selecting signal corresponding to the operating state of the load; and a gate resistance selecting part which selects gate resistances connected to gate terminals of the switching elements of the inverter main circuit by using the gate resistance selecting signal.

6 Claims, 12 Drawing Sheets

FIG. 5

HERE, RON2 = 2*RON, RON3 = RON1 = RON, ROFF2 = 2*ROFF, ROFF3 = ROFF1 = ROFF

| | OPERATING STATE | SWITCHING FREQUENCY (F) | PROCESSING RESULT | SELECTING SIGNAL SIGNAL 1 | SELECTING SIGNAL SIGNAL 2 | PWM SIGNAL | SWITCHING ELEMENT OPERATIONS (GATE CONTROL SIGNAL) CTL2 (Q2) | CTL3 (Q3) | CTL4 (Q4) | CTL5 (Q5) | GATE RESISTANCE (COMBINATION) TURN ON RESISTANCE: RG (ON) | TURN OFF RESISTANCE: RG (OFF) | COMPARE |
|---|---|---|---|---|---|---|---|---|---|---|---|---|---|
| MODE 0 | STOP | - | - | L | L | H | OFF | OFF | OFF | OFF | ∞ | ∞ | / |
| | | | | L | L | L | OFF | OFF | OFF | OFF | | | |
| MODE 1 | LIGHT LOAD OPERATION IN WHICH DIRECT CURRENTBUS VOLTAGE IS HIGH (IM<ILL) ∩(VDC>VDCH) | fc | 2 | H | L | H | ON | OFF | OFF | OFF | RON1 + RON2= 3*RON | ROFF1 + ROFF2= 3*ROFF | LARGE |
| | | | | H | L | L | OFF | ON | OFF | OFF | | | |
| MODE 2 | NORMAL OPERATION | fc | 3 | L | H | H | OFF | OFF | ON | OFF | RON1 + RON3= 2*RON | ROFF1 + ROFF3= 2*ROFF | MEDIUM |
| | | | | L | H | L | OFF | OFF | OFF | ON | | | |
| MODE 3 | OVERLOAD OPERATION: IM> IOL | fc | 1 | H | H | H | ON | OFF | ON | OFF | RON1 + (RON2//RON3)= 1.7*RON | ROFF1 + (ROFF2//ROFF3)= 1.7*ROFF | SMALL |
| | | | | H | H | L | OFF | ON | OFF | ON | | | |
| MODE 4 | RESTRICTED | 5fc | 1 | H | H | H | ON | OFF | ON | OFF | RON1 + (RON2//RON3)= 1.7*RON | ROFF1 + (ROFF2//ROFF3)= 1.7*ROFF | SMALL |
| | | | | H | H | L | OFF | ON | OFF | ON | | | |

FIG. 6

| | OPERATING STATE | SWITCHING FREQUENCY (F) | MOTOR CURRENT | CHARACTERISTICS WITH SELECTING CONTROL | | | CHARACTERISTICS WITHOUT SELECTING CONTROL | | | EFFECTS OF SELECTING CONTROL |
|---|---|---|---|---|---|---|---|---|---|---|
| | | | | SWITCHING TIME | AMOUNT OF PRODUCED NOISE | SWITCHING LOSS | SWITCHING TIME | AMOUNT OF PRODUCED NOISE | SWITCHING LOSS | |
| MODE 1 | LIGHT LOAD OPERATION IN WHICH DIRECT CURRENT BUS VOLTAGE IS HIGH | fc | SMALL | LARGE | SUPPRESSED | SMALL INCREASE | SMALL | LARGE | MEDIUM | NOISE PRODUCTION IS SUPPRESSED |
| MODE 2 | NORMAL OPERATION | fc | NORMAL | OPTIMUM | OPTIMUM | OPTIMUM | OPTIMUM | OPTIMUM | OPTIMUM | OPTIMUM DRIVING NUMBER (EFFICIENCY, NOISE) |
| MODE 3 | OVERLOAD OPERATION: IM > IOL | fc | LARGE | SMALL | SMALL INCREASE | SUPPRESSED | LARGE | MEDIUM | LARGE | SWITCHING LOSS IS SUPPRESSED |
| MODE 4 | RESTRICTION ELECTRICITY | 5fc | SMALL | SMALL | SMALL INCREASE | SUPPRESSED | LARGE | MEDIUM | LARGE | SWITCHING LOSS IS SUPPRESSED |

INVERTER CONTROLLER AND REFRIGERATING AND AIR-CONDITIONING UNIT

CROSS-REFERENCE TO RELATED APPLICATIONS

This application claims priority from Japanese Patent Application No. 2011-060752 filed on Mar. 18, 2011, the entire contents of which are incorporated herein by reference.

TECHNICAL FIELD

Aspects of the invention relate to an inverter controller that controls an inverter which is installed in an electrical apparatus such as an air conditioning apparatus, and an air conditioning apparatus which includes the inverter controller.

BACKGROUND

Generally, in an inverter, not only switching noise but also switching loss occurs due to the switching operations of switching elements configuring the inverter. In controlling the inverter, it is preferable to reduce both the switching noise and the switching loss. However, because reducing the noise and reducing the switching loss are conflicting requirements for the inverter, it is not easy to realize both of them.

In a related-art inverter controller, an amount of produced noise and an amount of switching loss in the inverter is adjusted by monitoring an amount of produced heat of a machine in which the inverter is installed and selecting resistance values of gate resistances which are connected to the switching elements of the inverter based on the amount of the produced heat (for example, refer to JP-A-2008-278584).

In a related-art air conditioning machine in which an inverter is installed, in the case of performing heating operation when the temperature of the outside air is low (low outside air temperature heating), a high heating ability is necessary. Because a compressor in a refrigerating cycle operates with a maximum number of revolutions, the motor current becomes the largest. However, because cooling fins are usually attached to inverter driving elements, and forced air-cooling is carried out by an outdoor unit fan, the temperature of the inverter driving elements is suppressed from rising even if the motor current is the largest. Therefore, the amount of switching loss in the inverter driving elements cannot be correctly obtained from a detected temperature of the switching elements. Therefore, even if the inverter controller as described in JP-A-2008-278584, which selects the resistance values of the gate resistances based only on the amount of produced heat of the machine to which the inverter is installed, is applied to an air conditioning machine, there is a problem that controlling the inverter with high efficiency cannot be realized.

Further, in an air conditioning machine, the amount of noise produced by the inverter varies depending on operating states. For example, when the outside air temperature is low at the time of cooling operation, when the air conditioning machine operates in a light load state such as a dry operation, or when a high voltage is supplied (direct current bus voltage is high), produced noise tends to increase. Therefore, in the related-art air conditioning machine, because it is necessary to suppress the amount of produced noise to be equal to or lower than a standard value that is regulated by the laws, switching time of the inverter driving elements, which is a main factor of noise production, is set to be a fixed large value. However, when the switching time is adjusted to be a fixed large value, if the air conditioning machine operates in an overload state, the switching loss becomes larger, thereby reducing air-conditioning ability of the air conditioning machine and the efficiency of controlling the inverter. In response to the increase of the switching loss, it becomes necessary to further enlarge the cooling fins of the inverter. Further, when a noise design is performed by setting a design value with an enough margin from the standard value regulated by the laws, there are problems that a size of a component for noise suppression increases, the number of components increases, and cost increases.

SUMMARY

Accordingly, illustrative aspects of the present invention are to solve the problems as described above. A first aspect is to obtain an inverter controller which causes an inverter to drive in the most suitable way so that both noise production and loss production in the inverter are taken into account even if an operating state of a machine, which is driven by the inverter, changes. Further, a second aspect is to obtain a refrigerating and air-conditioning unit which can perform the most suitable operations in which both noise production and loss production are taken into account.

According to an aspect of the invention, there is provided an inverter controller controlling an inverter main circuit which drives a load such as a motor by converting a direct current power of a direct current power source into an alternating current power, the inverter controller including: a PWM signal generating part which generates a PWM signal to control on-off of a plurality of switching elements configuring the inverter main circuit; an operating state detecting part which detects an operating state of the load based on a direct current bus voltage of the inverter main circuit, a motor current which flows between the inverter main circuit and the load and an operation instruction to the load; a gate resistance selecting signal generating part which generates a gate resistance selecting signal corresponding to the operating state of the load; and a gate resistance selecting part which selects gate resistances connected to gate terminals of the switching elements of the inverter main circuit by using the gate resistance selecting signal.

Accordingly, the inverter controller is formed so that the gate resistance for driving the switching elements of the inverter is optimally selected depending on the operating state of the load. Therefore, an inverter control, in which the trade-off between the produced noise and the loss (switching loss) is optimized, can be realized. Further, it is possible to eliminate a noise filter component, thereby realizing downsizing of the overall device including the load, lowering of cost and reduction of power consumption of the device.

BRIEF DESCRIPTION OF DRAWINGS

FIG. 5 describes the relations of various operating state modes with switching operations and gate resistance values in the first exemplary embodiment;

FIG. 6 describes the control effects of the various operating state modes in the first exemplary embodiment;

DETAILED DESCRIPTION

First Exemplary Embodiment

Figure 1:
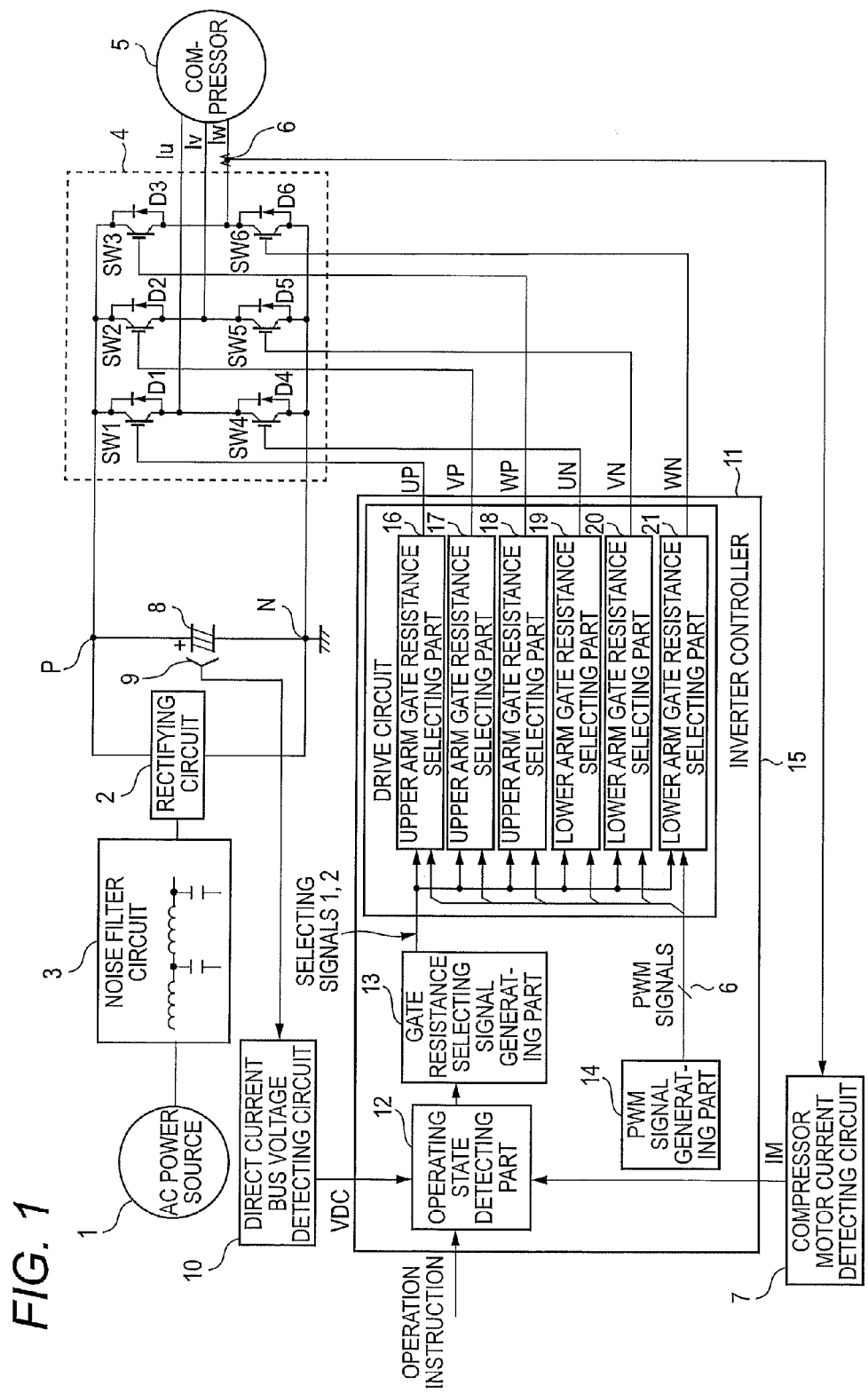
FIG. 1 shows a structure of an inverter controller in an first exemplary embodiment.

Hereinafter, structure and operations of an inverter controller in the first exemplary embodiment are described based on the figures. FIG. 1 shows a structure of an air conditioning machine which includes the inverter controller in the first exemplary embodiment. As shown in FIG. 1, the air conditioning machine includes an AC power source 1, a rectifying circuit 2, a noise filter circuit 3, an inverter main circuit 4, a compressor 5, a current sensor (for example, a current transformer) 6, a compressor motor current detecting circuit 7, a smoothing condenser 8, a voltage sensor 9, a direct current bus voltage detecting circuit 10 and an inverter controller 11. The rectifying circuit 2 converts the alternating current power of the AC power source 1 into a direct current power. The noise filter circuit 3 removes electromagnetic noise which is transmitted through power source lines connecting the AC power source 1 and the rectifying circuit 2. The inverter main circuit 4 converts the direct current power, which the rectifying circuit 2 outputs, into three phase alternating current power. The compressor 5 is driven by the three phase alternating current power which the inverter main circuit 4 outputs. The current sensor 6 (for example, a current transformer) detects a current that flows between the inverter main circuit 4 and the compressor 5. The compressor motor current detecting circuit 7 calculates a current value of the current flowing in the compressor 5 from detection signals which the current sensor 6 outputs. The smoothing condenser 8 smoothes an output voltage of the rectifying circuit 2. The voltage sensor 9 detects a direct current voltage between a direct current bus plus side and a direct current bus minus side which are the output sides of the rectifying circuit 2. The direct current bus voltage detecting circuit 10 calculates an output voltage value of the rectifying circuit 2 from a detection signal which the voltage sensor 9 outputs. The inverter controller 11 generates PWM drive signals to control the inverter main circuit 4 based on a detection result of the compressor motor current detecting circuit 7, a detection result of the direct current bus voltage detecting circuit 10 and an operation instruction value which is supplied from the outside.

The rectifying circuit 2 is configured by using a well known technique. For example, the rectifying circuit 2 is configured by a full wave bridge rectifier in which diodes are connected in a bridge form. Further, the rectifying circuit 2 may be formed to include a converter which has functions of stepping up and down or stepping down a DC voltage.

The inverter main circuit 4 is configured by power switching elements SW1 to SW6 and diodes D1 to D6 which are antiparallely connected to these power switching elements SW1 to SW6, respectively. An upper arm switching element group includes the switching elements SW1 to SW3 which are placed in the direct current bus plus side P of the output sides of the rectifying circuit 2. A lower arm switching element group includes the switching elements SW4 to SW6 which are placed in the direct current bus minus side N of the output sides of the rectifying circuit 2. In a three phase wire connection mode of the compressor 5, SW1 is a U phase upper arm switching element, SW2 is a V phase upper arm switching element, SW3 is a W phase upper arm switching element, SW4 is a U phase lower arm switching element, SW5 is a V phase lower arm switching element and SW6 is a W phase lower arm switching element, respectively.

A three phase electric motor (not shown in the figure) is provided inside the compressor 5. A current which flows through the U phase wire of the three phase electric motor will be described as a U phase electric current Iu, a current which flows through the V phase wire will be described as a V phase electric current Iv, and a current which flows through the W phase wire will be described as a W phase electric current Iw. The U phase electric current Iu, the V phase electric current Iv and the W phase electric current Iw are described as compressor motor currents hereinafter.

The current sensor 6 is attached to the W phase wire, and detects the W phase electric current Iw. The wire to which the current sensor 6 is attached may be the U phase wire or the V phase wire. It is also possible to use a DC current transformer (DCCT) which is able to detect DC electricity as the current sensor 6. The compressor motor current detecting circuit 7 converts the analog current signal which the current sensor 6 outputs into a digital motor current IM, and outputs the digital motor current IM to the inverter controller 11. The current sensor 6 and the compressor motor current detecting circuit 7 configure a compressor motor current detecting means. When there is no rapid variation (a level of several hundred ms or less) of the load like an air conditioning load, it is possible to detect a motor load by detecting a phase current of 1 phase. However, it is also possible to detect the motor load by detecting the phase currents of a plurality of phases.

The voltage sensor 9 divides the DC voltage which is applied to the smoothing condenser 8 and outputs a voltage signal. The direct current bus voltage detecting circuit 10 converts the analog voltage signal which the voltage sensor 9 outputs into a digital direct current bus voltage VDC, and outputs the digital direct current bus voltage VDC to the inverter controller 11. The voltage sensor 9 and the direct current bus voltage detecting circuit 10 configure a direct current bus voltage detecting means.

Next, the structure of the inverter controller 11 will be described. The inverter controller 11 includes an operating state detecting part 12, a gate resistance selecting signal generating part 13, a PWM signal generating part 14 and a drive circuit 15. The operating state detecting part 12 detects an operating state of the inverter based on the detection results which the compressor motor current detecting circuit 7 and the direct current bus voltage detecting circuit 10 output and an operation instruction which is input from the outside. The gate resistance selecting signal generating part 13 generates gate resistance selecting signals based on the operating state which the operating state detecting part 12 detects, to select gate resistances connected to the switching elements of the inverter main circuit 4. The PWM signal generating part 14 generates six PWM signals which are drive timing signals of the switching elements SW1 to SW6 of the inverter main circuit 4. The drive circuit 15 drives the switching elements SW1 to SW6 based on the gate resistance selecting signals which the gate resistance selecting signal generating part 13 outputs and the PWM signals which the PWM signal generating part 14 outputs.

The drive circuit 15 includes upper arm gate resistance selecting parts 16, 17 and 18 and lower arm gate resistance selecting parts 19, 20 and 21. Based on the gate resistance selecting signals which the gate resistance selecting signal generating part 13 outputs and the PWM signals which the PWM signal generating part 14 outputs, the upper arm gate resistance selecting parts 16, 17 and 18 selects the gate resistance elements which are connected to the gate terminals of the switching elements SW1 to SW3 to drive the switching elements, and the lower arm gate resistance selecting parts 19, 20 and 21 select the gate resistance elements which are connected to the gate terminals of the switching elements SW4 to SW6 to drive the switching elements.

Figure 3:
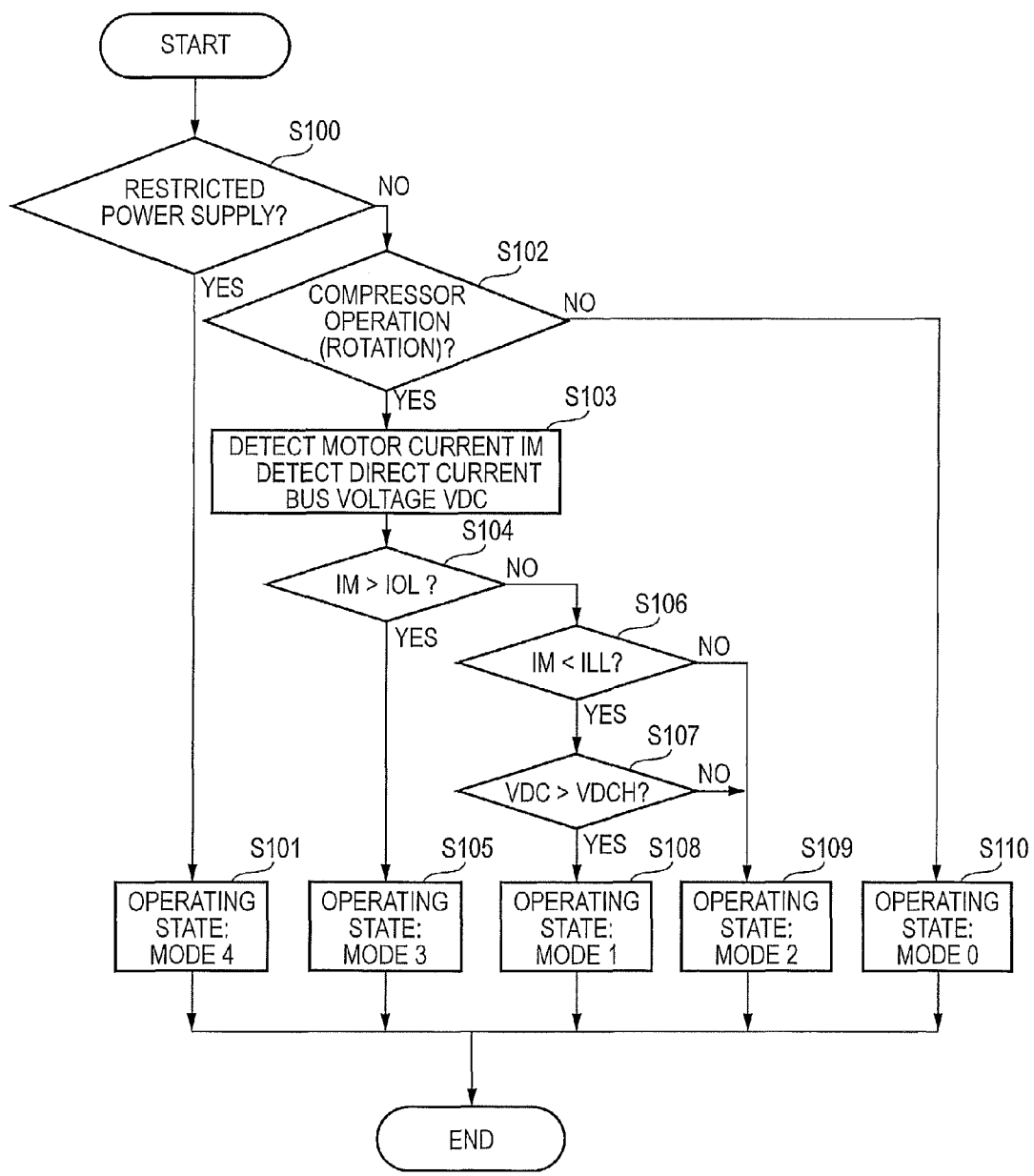
FIG. 3 is an operation flow diagram of an operating state detecting part in the first exemplary embodiment.

Next, operations of each block of the inverter controller 11 will be described. First, operations of the operating state detecting part 12 are described based on an operation flow of FIG. 3.

The operating state detecting part 12 determines whether the operation instruction which is supplied to the inverter controller 11 from the outside is a restricted power supply (step S100). Here, the restricted power supply is a power supply control in which power is supplied to the winding wire of the compressor 5 on condition that the compressor 5 is not rotationally driven and the compressor 5 is preheated. The restricted power supply is performed by causing the inverter main circuit 4 to perform switching operations to the compressor 5 which is in a stop state.

When the operation instruction is the restricted power supply, the operating state is set to a mode 4 (step S101). When the operation instruction is not the restricted power supply, it is determined whether the operation instruction is a compressor operation (rotation) (step S102). Here, the compressor operation (rotation) means an operation to rotationally drive the motor of the compressor. When the operation instruction is the compressor operation (rotation), the motor current IM which flows through the motor (not shown in the figure) which is provided inside the compressor 5 and the direct current bus voltage VDC are detected (step S103). Here, a value which the compressor motor current detecting circuit 7 outputs is imported and used as the motor current IM, and a value which the direct current bus voltage detecting circuit 10 outputs is imported and used as the direct current bus voltage VDC.

Then, the motor current IM is compared with an overload operation electric current threshold value IOL (hereinafter, referred to as current threshold value IOL (first threshold value)) (step S104). Here, the current threshold value IOL is a predetermined threshold value for determining whether a current value of the motor current IM is a current value corresponding to an overload operating state. When the motor current IM is larger than the current threshold value IOL, the operating state is set to a mode 3 (step S105). The mode 3 of the operating states corresponds to an overload operating state.

When the motor current IM is equal to or smaller than the current threshold value IOL, the motor current IM is compared with a light load operation electric current threshold value ILL (hereinafter, referred to as a current threshold value ILL (second threshold value)) (step S106). Here, the current threshold value ILL is a predetermined threshold value for determining whether the motor current IM is smaller than a predetermined value. When the motor current IM is smaller than the current threshold value ILL, the direct current bus voltage VDC is compared with a voltage threshold value VDCH (third threshold value.) (step S107). Here, the voltage threshold value VDCH is a predetermined threshold value for determining whether the direct current bus voltage VDC is a voltage larger than a predetermined value. When the direct current bus voltage VDC is larger than the voltage threshold value VDCH, the operating state is set to a mode 1 (step S108). The mode 1 of the operating states corresponds to a light load operating state in which the direct current bus voltage is high.

On the other hand, when the direct current bus voltage VDC is equal to or smaller than the voltage threshold value VDCH, the operating state is set to a mode 2 (step S109). When the motor current IM is equal to or larger than the current threshold value ILL in the step S106, the operating state is also set to the mode 2 (step S109).

When the operation instruction is not the compressor operation (rotation) in the step S102, the operation instruction is neither the restricted power supply nor the compressor operation (rotation), which means that the rotation of the compressor motor is stopped. Since the inverter drive is stopped, the operating state is set to a mode 0 (step S111).

The operating state detecting part 12 outputs an operating state mode determined by the above-mentioned processes to the gate resistance selecting signal generating part 13.

Figure 4:
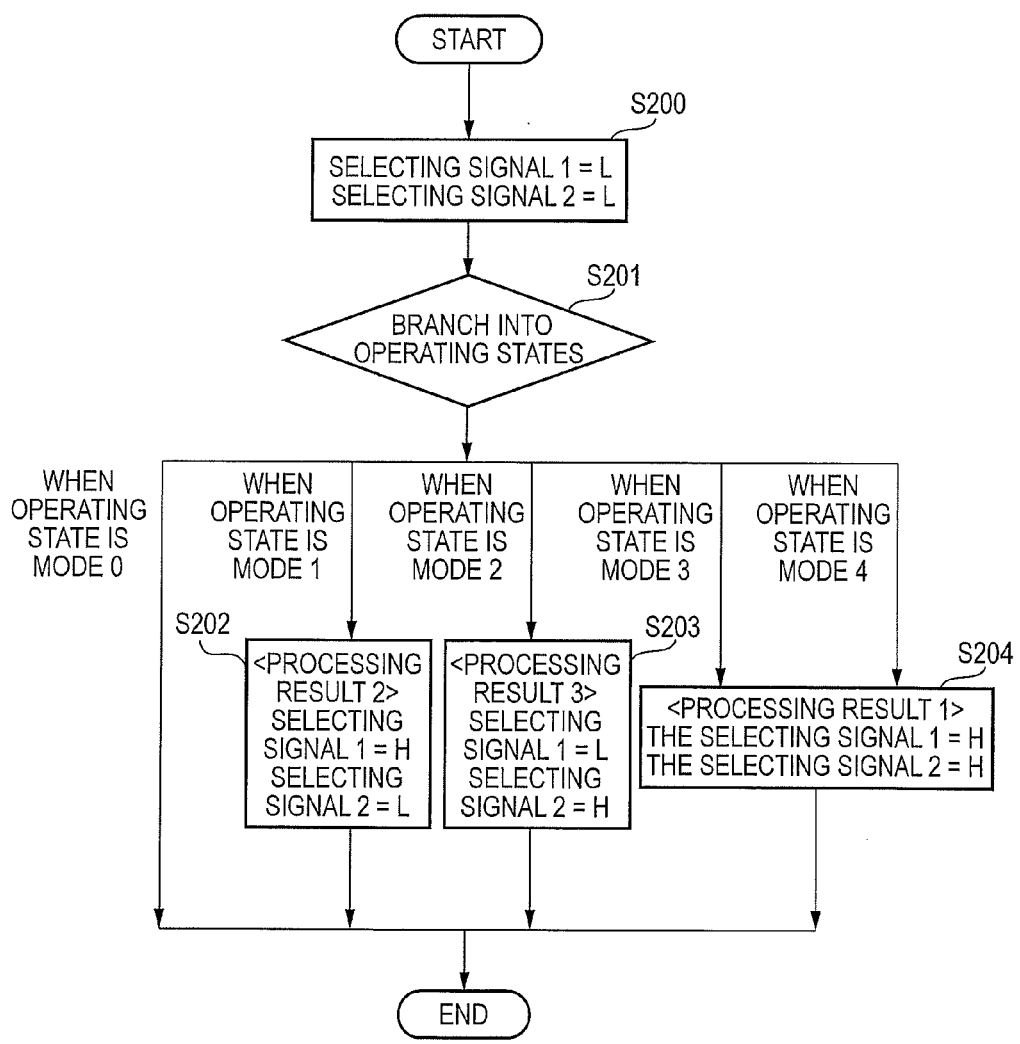
FIG. 4 is an operation flow diagram of a switching time selecting signal generating part in the first exemplary embodiment.

Next, operations of the gate resistance selecting signal generating part 13 will be described based on an operation flow of FIG. 4. After the operation starts, the values of the gate resistance selecting signals (selecting signal 1 and selecting signal 2) are set as initial values (step S200). The selecting signal 1 and the selecting signal 2 are control signals which take the logic value of High (hereinafter described as H) or Low (hereinafter described as L), and their initial values are L.

Then, processes are sorted in response to the mode value of the operating states that the operating state detecting part 12 outputs. The selecting signal 1 is H and the selecting signal 2 is H when the operating state is the mode 3 or 4 (processing result 1: step S204). The selecting signal 1 is H and the selecting signal 2 is L when the operating state is the mode 1 (processing result 2: step S202). The selecting signal 1 is L and the selecting signal 2 is H when the operating state is the mode 2 (processing result 3: step S203). The selecting signal 1 and the selecting signal 2 are kept as the initial values when the operating state is the mode 0.

The gate resistance selecting signal generating part 13 outputs the gate resistance selecting signals (the selecting signal 1 and the selecting signal 2) generated by the above-mentioned processes to the drive circuit 15.

The PWM signal generating part 14 generates PWM signals which are timing signals for selecting the switching elements SW1 to SW6 of the inverter main circuit 4 on-off based on the rotation state of the compressor motor and the operation instruction value. The PWM signals are six signals which correspond to the switching elements SW1 to SW6. The PWM signals corresponding to the upper arm switching elements SW1 to SW3 are described as a PWM (UP) signal, a PWM (VP) signal and a PWM (WP) signal, respectively, and PWM signals corresponding to the lower arm switching elements SW4 to SW6 are described as a PWM (UN) signal, a PWM (VN) signal and a PWM (WN) signal, respectively. The timing of the ON state of the switching element is shown as H (High) of the PWM signal, and the timing of the OFF state of the switching element is shown as L (Low) of the PWM signal.

Because the specific means for generating PWM signals is a well known technique, the details are not described here. For example, as described in JP-A-H11-4594, an operating state of a compressor motor may be detected by using a shunt resistor provided in a direct current bus, and PWM signals may be generated by a vector control in combination with operation instruction information.

The drive circuit 15 selects the gate resistances according to the operating state modes and the PWM signals to drive the switching elements SW1 to SW6. Because the structures of the gate resistance selecting parts in the upper arm gate resistance selecting parts 16, 17 and 18 and the lower arm gate resistance selecting parts 19, 20 and 21 are different, they will be described sequentially.

Figure 2:
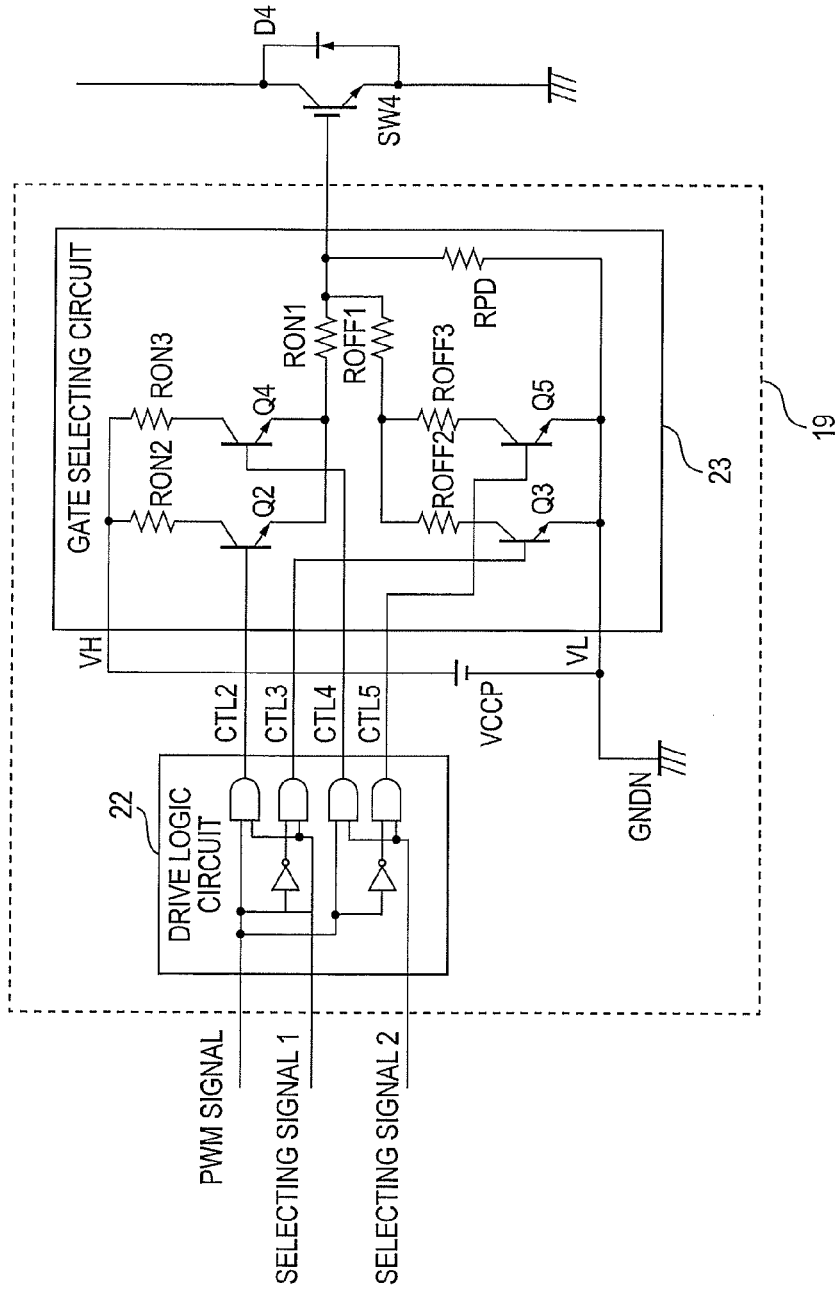
FIG. 2 shows a structure of a lower arm gate resistance selecting part in the first exemplary embodiment.

Because the lower arm gate resistance selecting parts 19, 20 and 21 all have the same structure, the structure of the lower arm gate resistance selecting part 19 will be described. The detailed structure of the lower arm gate resistance selecting part 19 is shown in FIG. 2. The lower arm gate resistance selecting part 19 includes a drive logic circuit 22 and a gate selecting circuit 23. The lower arm gate resistance selecting part 19 generates a drive signal UN, which drives the lower arm switching element SW4, from the selecting signal 1 and the selecting signal 2 which the gate resistance selecting signal generating part 13 generates and the PWM (UN) signal which the PWM signal generating part 14 generates.

The drive logic circuit 22 generates gate control signals CTL2, CTL3, CTL4 and CTL5 of switching elements Q2, Q3, Q4 and Q5 in the gate selecting circuit 23, based on the selecting signal 1, the selecting signal 2 and the PWM (UN) signal. The correspondence of the selecting signal 1, the selecting signal 2 and the PWM (UN) signal with the gate control signals is shown in FIG. 5. For each mode of the operating states, the values of the gate control signals of the switching elements Q2, Q3, Q4 and Q5 ("switching element operations" column of FIG. 5) corresponding to the values (High and Low) of the PWM signal are shown in FIG. 5. Here, if a gate control signal value is ON, it means that the switching element Q2 or the like is in an ON state, and if a gate control signal value is OFF, it means that the switching element Q2 or the like is in an OFF state. The drive logic circuit 22 outputs the gate control signals CTL2, CTL3, CTL4 and CTL5 of the switching elements Q2, Q3, Q4 and Q5 according to the logic table. Here, the drive logic circuit 22 shown in FIG. 2 includes four AND elements and two NOT elements. However, it is also possible that the drive logic circuit 22 has other logic structures.

The gate selecting circuit 23 includes four switching elements Q2, Q3, Q4 and Q5 such as transistors, resistance elements RON2, RON3, ROFF2 and ROFF3 which are connected to the collector terminals of these switching elements, respectively, a resistance element RON1 which is connected to the emitter terminals of the switching elements Q2 and Q4, a resistance element ROFF1 which is connected to the collector terminals of the switching elements Q3 and Q5 through the resistance elements ROFF2 and ROFF3, and a resistance RPD which functions as a pull down resistance of the gate signal of the switching element SW4. The gate control signals CTL2, CTL3, CTL4 and CTL5 are connected to the gate terminals of the switching elements Q2, Q3, Q4 and Q5, respectively. A DC power source VCCP and a ground electric potential GNDN are connected to a high voltage power source terminal VH and a low voltage power source terminal VL, respectively.

Next, operations of the lower arm gate resistance selecting part 19 corresponding to the respective operating states will be described. To make the description concise, as exemplified in FIG. 5, the values of the resistance elements are defined as follows: RON2=2*RON, RON3=RON1=RON, ROFF2=2*ROFF, and ROFF3=ROFF1=ROFF. Here, RON and ROFF are predetermined resistance values.

When the operating state is the mode 0 (stop), regardless of the value of the PWM signal, the switching elements Q2, Q3, Q4 and Q5 are all OFF, and the gate resistance value becomes infinite (∞). Therefore, the switching element SW4 of the inverter main circuit 4 is not driven.

When the operating state is the mode 1 (light load operation in which the direct current bus voltage is high), and the PWM signal is H (ON timing of PWM), because only the switching element Q2 is ON, and the other switching elements Q3, Q4 and Q5 are OFF, the gate resistance becomes the resistance of RON1 and RON2 that are connected in series. In this way, the switching element SW4 of the inverter main circuit 4 is driven to be ON through the gate resistance (=3*RON) by the PWM signal.

On the other hand, when the PWM signal is L (OFF timing of PWM), because only the switching element Q3 is ON, and the other switching elements Q2, Q4 and Q5 are OFF, the gate resistance becomes the resistance of ROFF1 and ROFF2 that are connected in series. In this way, the switching element SW4 of the inverter main circuit 4 is driven to be OFF through the gate resistance (=3*ROFF) by the PWM signal.

When the operating state is the mode 3 (overload operation), and the PWM signal is H (ON timing of PWM), because the switching elements Q2 and Q4 are ON, and the other switching elements Q3 and Q5 are OFF, the gate resistance becomes the resistance of RON2 and RON3 connected in parallel and RON1 which are connected in series. In this way, the switching element SW4 of the inverter main circuit 4 is driven to be ON through the gate resistance (=1.7*RON) by the PWM signal.

On the other hand, when the PWM signal is L (OFF timing of PWM), because the switching elements Q3 and Q5 are ON, and the other switching elements Q2 and Q4 are OFF, the gate resistance becomes the resistance of ROFF2 and ROFF3 connected in parallel and ROFF1 which are connected in series. In this way, the switching element SW4 of the inverter main circuit 4 is driven to be OFF through the gate resistance (=1.7*ROFF) by the PWM signal.

When the operating state is the mode 4 (restricted power supply), because the mode 4 and the mode 3 (overload operation) are the same in the states of the output signals of the drive logic circuit 22, the states of switching elements Q2, Q3, Q4 and Q5 become the same as those of the mode 3. That is, when the PWM signal is H (ON timing of PWM), the switching element SW4 of the inverter main circuit 4 is driven to be ON through the gate resistance (=1.7*RON), and when the PWM signal is L (OFF timing of PWM), the switching element SW4 of the inverter main circuit 4 is driven to be OFF through the gate resistance (=1.7*ROFF).

When the operating state is the mode 2 (normal operation), and the PWM signal is H (ON timing of PWM), because only the switching element Q4 is ON, and the other switching elements Q2, Q3 and Q5 become OFF, the gate resistance becomes the resistance of RON1 and RON3 that are connected in series. In this way, the switching element SW4 of the inverter main circuit 4 is driven to be ON through the gate resistance 2*RON) by the PWM signal.

On the other hand, when the PWM signal is L (OFF timing of PWM), because only the switching element Q5 is ON, and the other switching elements Q2, Q3 and Q4 become OFF, the gate resistance becomes the resistance of ROFF1 and ROFF3 that are connected in series. In this way, the switching element SW4 of the inverter main circuit 4 is driven to be OFF through the gate resistance (=2*ROFF) by the PWM signal.

When the gate resistance values of respective operation modes are compared with that of the mode 2 (normal operation) as a standard, it is found that the gate resistance value in the case of the mode 1 (light load operation in which the direct current bus voltage is high) is larger, and the gate resistance values in the cases of the mode 3 (overload operation) and the mode 4 (restricted power supply) is smaller.

Figure 7:
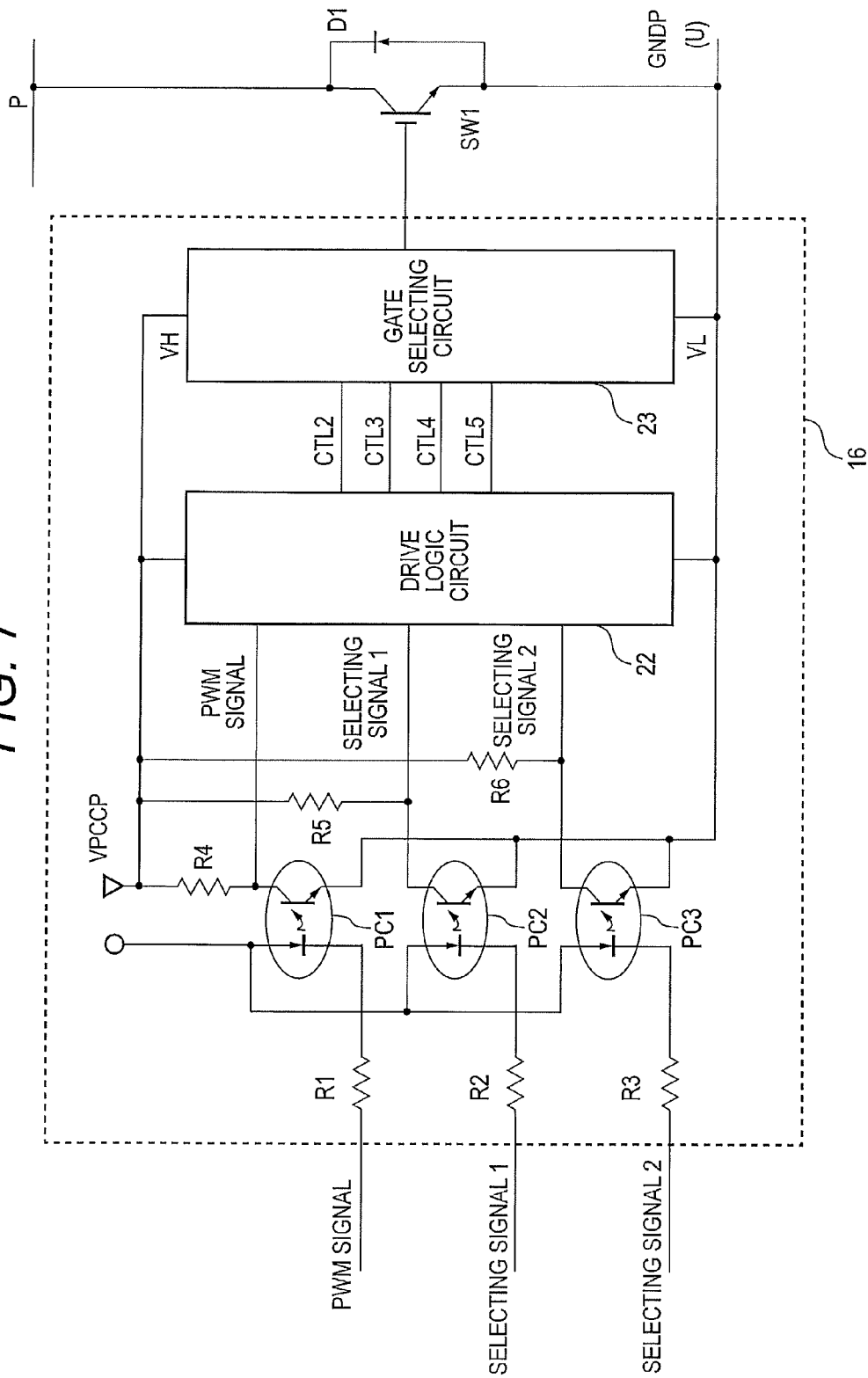
FIG. 7 shows a structure of an upper arm gate resistance selecting part in the first exemplary embodiment.

Next, the structures of the upper arm gate resistance selecting parts 16, 17 and 18 will be described. Because the upper arm gate resistance selecting parts 16, 17 and 18 all have the same structure, the structure of the upper arm gate resistance selecting part 16 is described based on FIG. 7. The same parts as those of the internal structure of the lower arm gate resistance selecting part 19 are referred to by the same symbols and their descriptions are omitted.

The upper arm gate resistance selecting part 16 receives the selecting signal 1 and the selecting signal 2 which the gate resistance selecting signal generating part 13 generates and the PWM (UP) signal which the PWM signal generating part 14 generates in a drive logic circuit 22 through photo couplers PC1, PC2 and PC3. The power source system of the drive logic circuit 22 and the gate selecting circuit 23 and the power source system of the gate resistance selecting signal generating part 13 and the PWM signal generating part 14 can be electrically insulated by using the photo couplers PC1, PC2 and PC3. The drive logic circuit 22 and the gate selecting circuit 23 are the same in structure as the drive logic circuit 22 and the gate selecting circuit 23 of the lower arm gate resistance selecting part 19. The drive logic circuit 22 generates gate control signals CTL2, CTL3, CTL4 and CTL5 of the switching elements Q2, Q3, Q4 and Q5 in the gate selecting circuit 23 according to the logic table of FIG. 5. The gate selecting circuit 23 performs the selecting of the gate resistance based on the gate control signals CTL2, CTL3, CTL4 and CTL5. The detailed gate resistance selecting operations of the gate selecting circuit 23 are the same as the operations of the gate selecting circuit 23 in the lower arm gate resistance selecting part 19.

Because the reference potential (VL) of the gate selecting circuit 23 in the upper arm gate resistance selecting part 16 becomes the same as the emitter electric potential GNDP (U) of the U phase upper arm switching element SW1, the upper arm switching element SW1 can be driven by the output signal of the gate selecting circuit 23.

FIG. 6 is a figure in which characteristics and effects of the gate resistance selecting control by the inverter controller 11 are organized for respective operating state modes. In FIG. 6, characteristics when the gate resistance selecting control is not performed are also shown for comparison.

When the operating state is the mode 1 (light load operation in which the direct current bus voltage is high), because the gate resistance is selected to a big resistance value, the switching time increases and the amount of produced noise by the switching can be suppressed. As explained hereinafter, it is possible to suppress the increased amount of the switching loss to be small by increasing the gate resistance.

Figure 8:
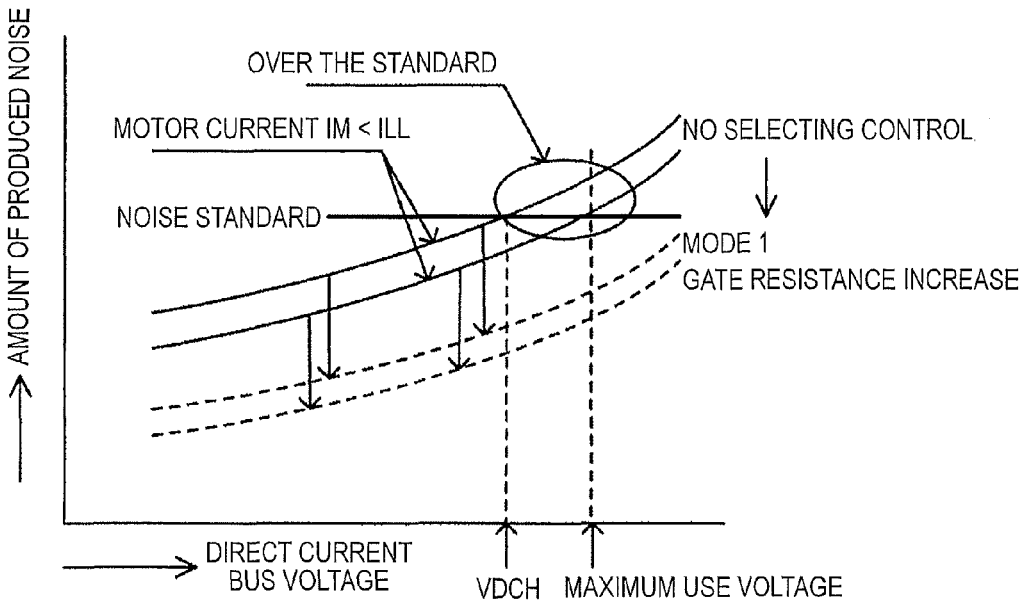
FIG. 8 describes the control of an operating state mode 1 in the first exemplary embodiment.

FIG. 8 describes the relation of the amount of produced noise and the direct current bus voltage for the gate resistance selecting control when the operating state is the mode 1. In FIG. 8, two solid curved lines are the characteristics when the gate resistance selecting control is not carried out, and two dotted curve lines are the characteristics when the gate resistance is increased by the gate resistance selecting control. The two curved lines in each case correspond to the maximum values and minimum values of the characteristics respectively when the individual variation in products is taken into account.

Figure 9:
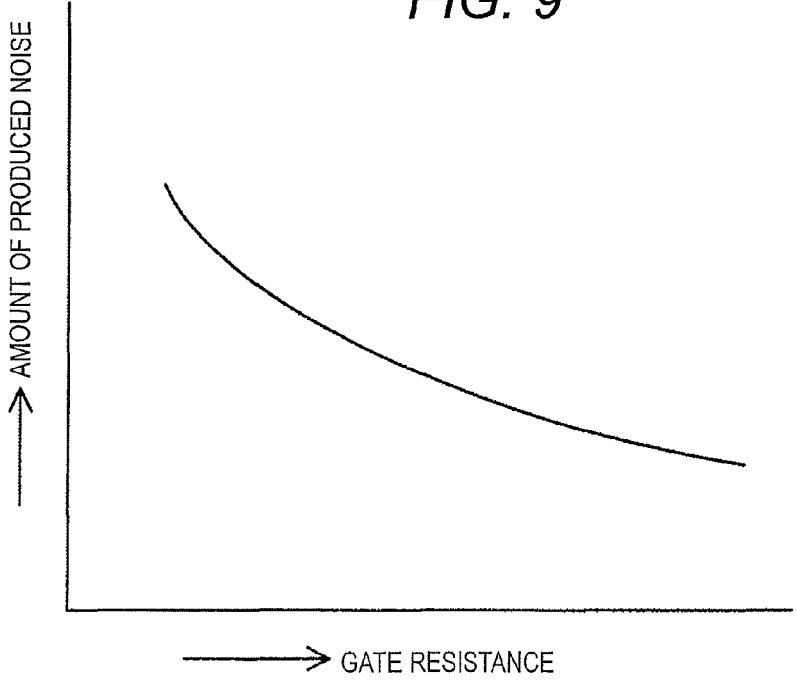
FIG. 9 shows a relation of the amount of produced switching noise and the gate resistance.
Figure 10:
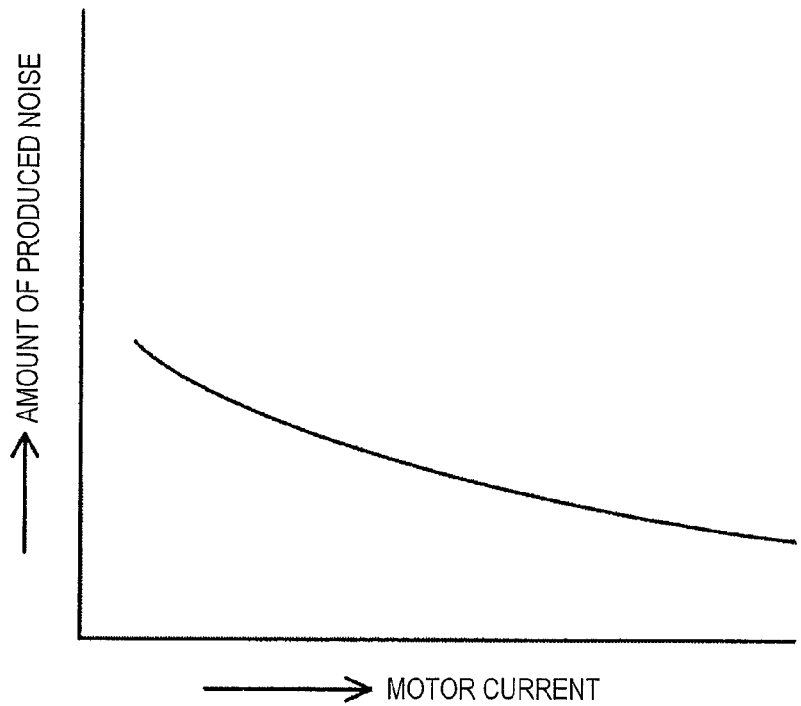
FIG. 10 shows a relation of the amount of produced switching noise and the motor current.
Figure 11:
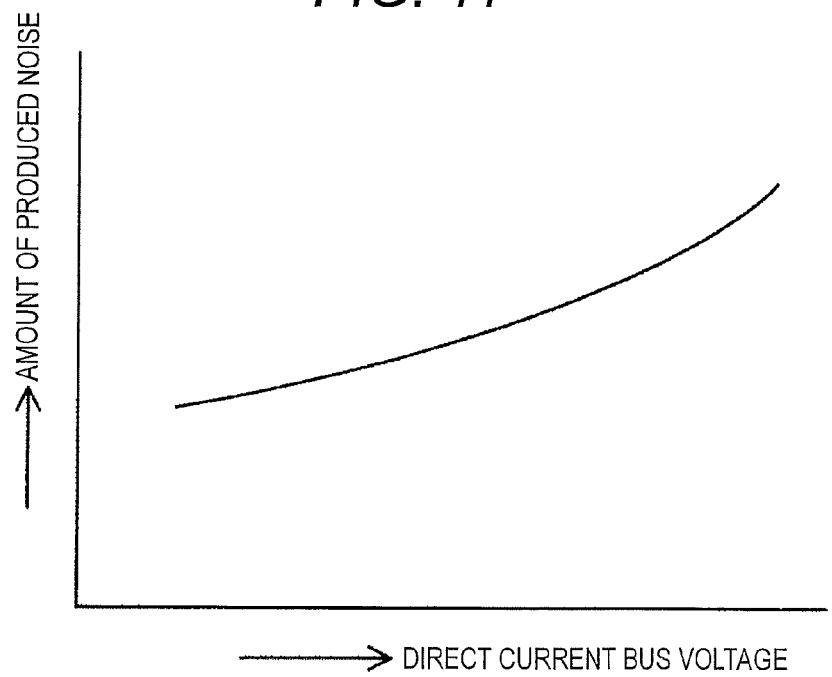
FIG. 11 shows a relation of the amount of produced switching noise and the direct current bus voltage.

When the gate resistance selecting control is not performed, since the motor current is small, and the direct current bus voltage is high, the amount of produced noise tends to become large as can be seen from the characteristics of FIG. 10 (relation of the amount of produced noise and the motor current) and FIG. 11 (relation of the amount of produced noise and the direct current bus voltage). Therefore, when the gate resistance selecting control is not carried out as shown in FIG. 8, if the direct current bus voltage is equal to or larger than VDCH, it is found that a phenomenon would occur that the amount of produced noise does not meet a noise standard. Here, the noise standard is an allowable standard value of the amount of produced noise set by civil laws or a product specification upon shipment. On the other hand, because, as shown in FIG. 9, the amount of produced noise decreases when the gate resistance increases, if the direct current bus voltage is equal to or lower than a maximum use voltage, the amount of produced noise can be suppressed to be equal to or lower than the noise standard. Thus, if a gate resistance value is set so that the maximum value of the amount of produced noise is equal to the noise standard when the individual variation of products is taken into account in the characteristics after the gate resistance selecting, because the gate resistance value can be the smallest gate resistance value that meets the noise standard, the increase of the switching loss can be lowered. In consideration of a margin of the noise standard, the gate resistance value may be set so that the maximum value of the amount of produced noise becomes equal to or lower than the noise standard.

Figure 12:
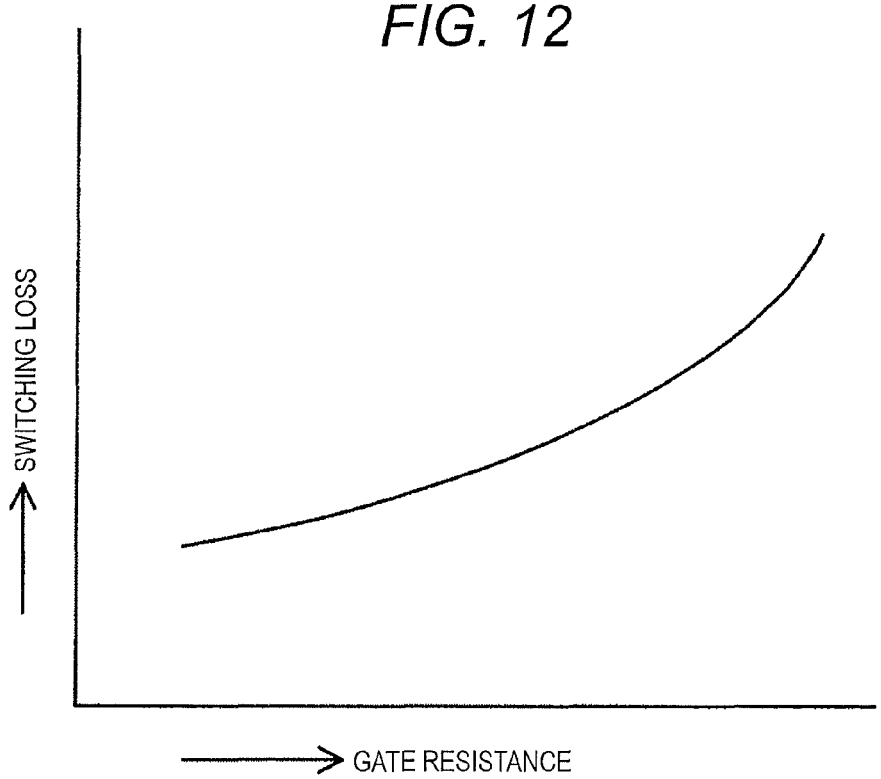
FIG. 12 shows a relation of the switching loss and the gate resistance.
Figure 13:
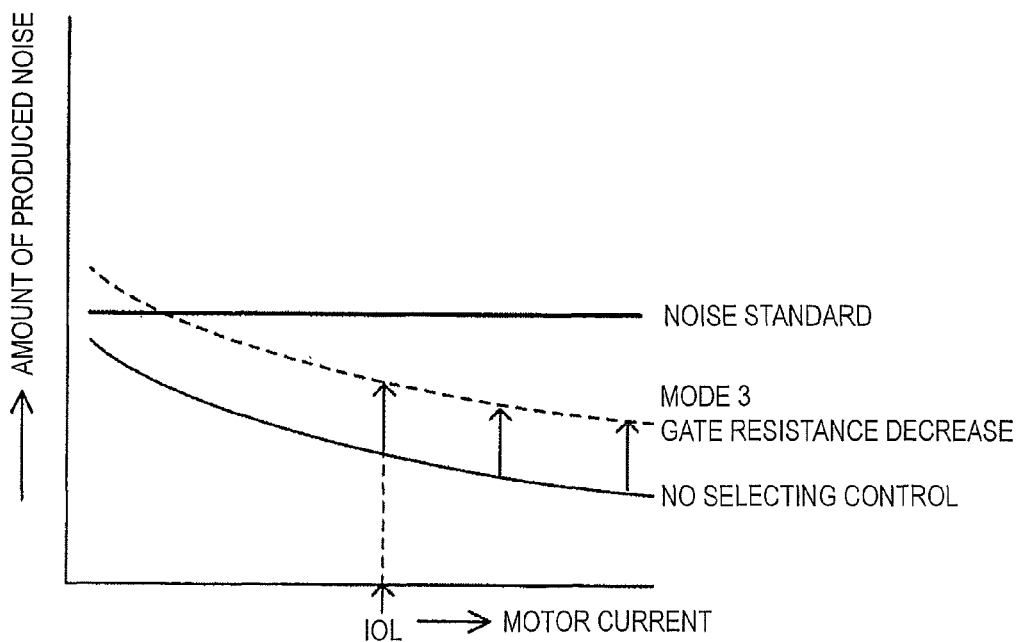
FIG. 13 describes the control of an operating state mode 3 (noise production) in the first exemplary embodiment.
Figure 14:
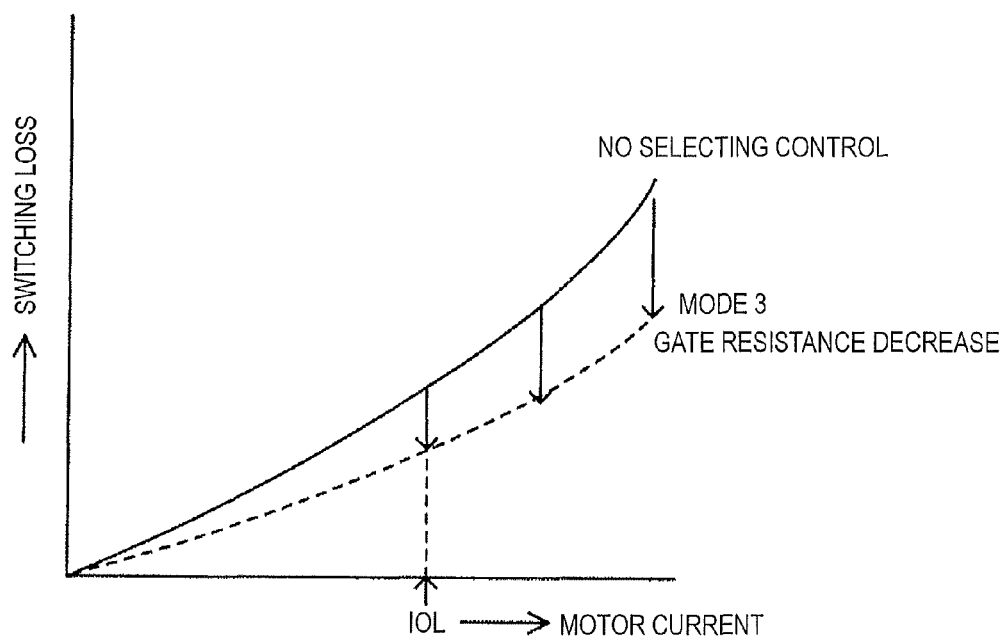
FIG. 14 describes the control of the operating state mode 3 (switching loss) in the first exemplary embodiment.

When the operating state is the mode 3 (overload operation), because the gate resistance is selected to a small resistance value, the switching loss can be suppressed. As shown in FIG. 12 (relation of the switching loss and the gate resistance), the switching loss tends to decrease when the gate resistance becomes smaller. Further, the decrease of the switching loss occurs in the whole range of the motor current value as shown in FIG. 14. On the other hand, as shown in FIG. 9, the amount of produced noise increases when the gate resistance decreases. However, as shown in FIG. 13, if a gate resistance value after the gate resistance selecting is set so that the amount of produced noise after the selecting becomes equal to or lower than the noise standard in a range where the motor current is equal to or larger than a predetermined value IOL, the increase of the amount of produced noise can be suppressed. In particular, if the gate resistance value is set so that the amount of produced noise when the motor current is IOL is equal to the noise standard, because the gate resistance can be set to a minimum gate resistance value that meets the noise standard, the switching loss can be suppressed to a maximum extent while meeting the noise standard. In consideration of a margin of the noise standard, the gate resistance value may be set so that the maximum value of the amount of produced noise becomes equal to or lower than the noise standard.

When the operating state is the mode 4 (restricted power supply), except that the switching frequency is larger than that of a normal operation (for example, 5 times) and the motor current is small, the same control is performed as when the operating state is the mode 3 (overload operation). That is, because the gate resistance is selected to a small resistance value while minimizing the increase of the amount of produced noise, the switching loss can be suppressed.

When the operating state is the mode 2 (normal operation), because the most suitable gate resistance at the time of the normal operation is used, the operation can be performed in a range that there are not any problems of the switching loss and the amount of produced noise.

Figure 15:
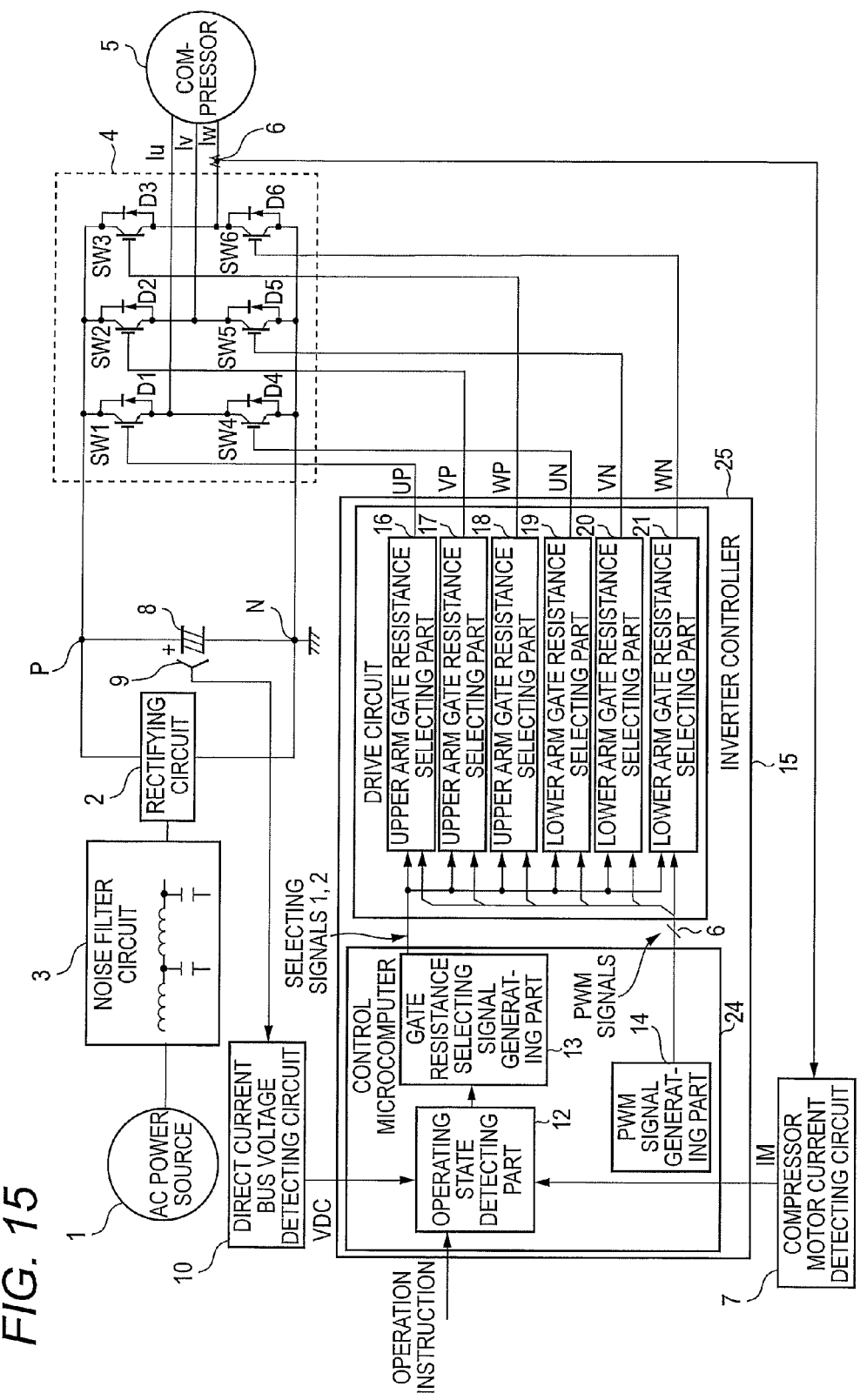
FIG. 15 shows a structure of an inverter controller (using a control microprocessor) in the first exemplary embodiment.

In the above description, the respective control blocks of the inverter controller 11 are configured individually. However, the inverter control part may be configured by a control microcomputer. FIG. 15 shows an inverter controller 25 in which the functions of the operating state detecting part 12, the gate resistance selecting signal generating part 13 and the PWM signal generating part 14 are performed by software control using a control microcomputer 24.

If the inverter controller 25 is used, with respect to the noise produced by the inverter, the relation of the gate resistance (speeds of switching operations: time of turning on-off) and the amount of produced noise, and the relation of the operating mode of the air conditioning machine (the direct current bus voltage, the electric current) and the amount of produced noise are measured beforehand. The result of the measurement is recorded as a data table in a storage medium (ROM: not shown in the figure) which is connected to the control microcomputer 24. In this way, the inverter drive control can be realized in which the most suitable gate resistance is selected by setting the operating state mode of the air conditioning machine based on the respective detection signals of the direct current bus voltage detecting circuit 10 and the compressor motor current detecting circuit 7 and referring to the data table based on the set operating state mode and the measurement data.

Further, the inverter controller which is described in the present exemplary embodiment is particularly effective when the switching elements SW1 to SW6 of the inverter main circuit 4 or the diodes D1 to D6 antiparallely connected with the switching elements SW1 to SW6 or both of them are formed of wide band gap semiconductor.

When the inverter controller is controlled in the operating state mode 1 (light load operation in which the direct current bus voltage is high), the switching loss increases with the increase of the switching time. However, the wide band gap semiconductor has a characteristic that the switching loss is less than that of Si (silicon) semiconductor. Therefore, the produced noise can be further reduced by making this switching loss decrease to correspond to the decrease of the switching speed (increase of the switching time). Therefore, the cost for noise reduction measures, such as noise filter components, can be further reduced.

Further, when the inverter controller is controlled in the operating state mode 3 (overload operation) or mode 4 (restricted power supply), because the wide band gap semiconductor has a characteristic that it is possible to act at a higher frequency than that of the Si semiconductor, the variable range of the switching time (equal to or more than 10 times that of the Si semiconductor) is enlarged. Therefore, it is possible to more flexibly control the switching time.

The wide band gap semiconductor includes SiC (silicon carbide), GaN (gallium nitride), diamond and the like. Because a wide band gap semiconductor element has a smaller element loss than a Si semiconductor element, the heat produced by the wide band gap semiconductor element is smaller. Further, because the melting point of the wide band gap semiconductor element is higher than that of the Si semiconductor element and is equal to or higher than 200° C., it is possible for the wide band gap semiconductor element to operate at a high temperature. Further, because the thermal conductivity is also preferable, it is possible to operate even if there is not a fin for heat dissipation.

As described above, the inverter controller in the present exemplary embodiment is formed so that the gate resistance for driving the switching elements of the inverter is optimally selected depending on the operating state by detecting the use environment (the direct current bus voltage) of the device and the operating state of the device. Therefore, an inverter control, in which the trade-off between the produced noise and the loss (switching loss) is optimized, can be realized. Further, it is possible to eliminate a noise filter component, thereby realizing downsizing of the overall device, lowering of cost and reduction of power consumption of the device.

What is claimed is:

1. An inverter controller controlling an inverter main circuit which drives a load such as a motor by converting a direct current power of a direct current power source into an alternating current power, the inverter controller comprising:
   a PWM signal generating part which generates a PWM signal to control on-off of a plurality of switching elements configuring the inverter main circuit;
   an operating state detecting part which detects an operating state of the load based on a direct current bus voltage of the inverter main circuit, a motor current which flows between the inverter main circuit and the load and an operation instruction to the load;
   a gate resistance selecting signal generating part which generates a gate resistance selecting signal corresponding to the operating state of the load; and
   a gate resistance selecting part which selects gate resistances connected to gate terminals of the switching elements of the inverter main circuit by using the gate resistance selecting signal.

2. The inverter controller according to claim 1,
   wherein the operating state detecting part detects any one of:
      a normal operating state;
      a light load operating state in which the direct current bus voltage is high;
      an overload operating state;
      a restricted power supply state; and
      a stop state
   as the operating state of the load, and
      wherein the gate resistance selecting signal generating part generates the gate resistance selecting signal such that;
         when the operating state is the light load operating state in which the direct current bus voltage is high, the gate resistance is selected to a gate resistance having a resistance value larger than that of the gate resistance when the operating state is the normal operation;
         when the operating state is the overload operating state or the restricted power supply state, the gate resistance is selected to a gate resistance having a resistance value smaller than that of the gate resistance when the operating state is the normal operation; and
         when the operating state is the stop state, the gate terminal is opened.

3. The inverter controller according to claim 1,
   wherein the operating state detecting part detects the operating state as a restricted power supply state when the operation instruction is restricted power supply,
   wherein the operating state detecting part detects the operating state as an overload operating state when the operation instruction is a rotational operation other than the restricted power supply and the motor current is larger than a predetermined first threshold value,
   wherein the operating state detecting part detects the operating state as a light load operating state in which the direct current bus voltage is high when the operation instruction is a rotational operation other than the restricted power supply, the motor current is smaller than a predetermined second threshold value and the direct current bus voltage is larger than a predetermined third threshold value, wherein the operating state detecting part detects the operating state as a stop state when the operation instruction is neither the restricted power supply nor the rotational operation, and wherein the operating state detecting part detects the operating state as a normal operating state when the operating state is none of the restricted power supply state, the overload operating state, the light load operating state in which the direct current bus voltage is high and the stop state.

4. The inverter controller according to claim 1,
wherein among the switching elements and diode elements configuring the inverter circuit, at least one element is formed of wide band gap semiconductor.

5. The inverter controller according to claim 4,
wherein the wide band gap semiconductor is silicon carbide, gallium nitride based material or diamond.

6. A refrigerating and air-conditioning unit comprising:
the inverter controller according to claim 1;
an inverter main circuit which is controlled by the inverter controller; and
a load device such as a motor which is driven by the inverter main circuit.

* * * * *